United States Patent [19]

Lee

[11] Patent Number: 5,456,486
[45] Date of Patent: Oct. 10, 1995

[54] REAR WHEEL SUSPENSION FOR VEHICLE

[75] Inventor: Unkoo Lee, Kyungki-Do, Rep. of Korea

[73] Assignee: Hyundai Motor Company, Seoul, Rep. of Korea

[21] Appl. No.: 159,534

[22] Filed: Dec. 1, 1993

[30] Foreign Application Priority Data

Dec. 2, 1992 [KR] Rep. of Korea ............... 1992-23101

[51] Int. Cl.$^6$ .................. B60G 11/20; B60G 9/00
[52] U.S. Cl. .......................... 280/689; 280/723
[58] Field of Search .................. 280/688, 689, 280/723, 717; 267/273, 285

[56] References Cited

U.S. PATENT DOCUMENTS

| 4,458,917 | 7/1984 | Maru et al. | 280/718 |
| 4,765,650 | 8/1988 | Kameshima | 280/723 |

FOREIGN PATENT DOCUMENTS

| 1204893 | 1/1960 | France | 280/688 |
| 1043835 | 11/1958 | Germany | 280/688 |
| 52-25319 | 2/1977 | Japan | 280/689 |
| 61-50812 | 3/1986 | Japan | 280/689 |

*Primary Examiner*—Karin L. Tyson
*Attorney, Agent, or Firm*—Birch, Stewart, Kolasch & Birch

[57] ABSTRACT

A rear wheel suspension for a vehicle includes an axle beam for rotatably supporting wheels disposed on both sides of the axle beam, a strut assembly disposed on an upper portion of both ends of the axle beam, and a lateral rod having first connecting portions connected to a first end of the axle beam and second connecting portions connected to a car body on the opposite end of the lateral rod to be horizontally disposed in the direction of an axle. The lateral rod has an upper and a lower rod spaced apart by a first width at the first end and spaced apart by a second width at the second end, wherein the first connecting portion is connected to the axle beam by inserting a separate connecting member therebetween and the second connecting portion is connected directly to the car body.

3 Claims, 3 Drawing Sheets

REAR WHEEL SUSPENSION FOR VEHICLE

BACKGROUND OF THE INVENTION

1. Field of the Invention

The present invention relates to a rear wheel suspension for a vehicle and, more particularly, to a rear wheel suspension for a vehicle which ensures a freedom of layout of the suspension system and can enhance riding comfort and handling safety by minimizing the amount of movement in a transverse direction during up-and-down movement of a wheel and reducing the height of a roll center.

2. Description of Conventional Art

A suspension for a vehicle connects an axle and a car body to each other, and controls a position of a tire with respect to the car body for its optimal position during a vehicle's running. Thus, optimal handling safety may be thereby obtained, and it prevents the axle from directly transmitting impact or vibration from a road surface to the car body. It also prevents damage to cargo, thereby improving riding comfort.

Particularly in a front wheel suspension, the suspension should be designed to absorb vibration or impact from the road surface as well as obtain running safety by maintaining an optimal position in a vehicle's straight ahead position and handling safety in a vehicle's turning position.

The suspension system is structurally characterized as an integral shaft suspension and an independent suspension. The suspension of this invention concerns an independent suspension using a lateral rod that provides restraint against lateral movement.

That is, in the above suspension, rotating power that is applied to the shaft and forces that act in forward and rearward directions are transmitted to a car body through a control rod or a trailing arm. The lateral movement is transmitted to the car body through a lateral rod disposed horizontally with respect to the car body.

Further, steering stability of the vehicle is closely related to the movement of the car body. During the vehicle's running, rolling, pitching, and yawing occur in addition to bounce. These movements should be absorbed to increase the stability and the ride comfort.

In such vibrations, the rolling occurs at a predetermined point when a vehicle is turning, and this point is called a roll center. The variation rate of the roll center's height has an effect on the running safety and steering stability of the vehicle. Accordingly, to achieve running safety, it is more desirable to decrease the variation rate of the roll center's height.

Referring now to FIG. 3 depicting the suspension system using a conventional lateral rod, a buffer 52 that can absorb impact and vibration of each wheel 50 is mounted on an axle beam 51 rotatably supporting wheels 50 in both sides (a suspension system has a different structure in accordance with a suspension mode, and a shock absorber is shown in FIG. 3). A lateral rod 53 disposed laterally with respect to a car body has one end fixed to one side of the axle beam 51 by means of a first elastic bush 54 and the other end fixed to a mounting bracket 55 formed on a lower part of the car body on the opposite side by means of a second elastic bush 56. The lateral rod is thereby disposed at a slant.

The rotating power or forward and rearward forces applied to the axle beam 51 are transmitted to the car body through a control rod or a trailing arm (not illustrated). The up-and-down vibration is absorbed by the buffer 52, and lateral movement is restrained by the lateral rod 53 so that the car body does not vibrate.

In the above suspension system, however, only one lateral rod 53 is provided, and during the up-and-down vibration of the wheels 50 or rolling of the car body, the wheels 50 move upwardly and downwardly moving along a trace of the lateral rod 53 using as a hinge the second elastic bush 56 having a predetermined length, and an amount of movement $\alpha$ with respect to the lateral direction of the wheels 50 becomes large. The car's straight ahead stability is therefore not very good.

The roll center RC disposed near an intersecting point of the slanting line of the lateral rod 53 and a center line CL of the car body is positioned limitedly on a place (the roll center RC is shown as being positioned on the lateral rod 53 in the drawing, and is actually disposed on the upper portion of the axle beam 51 on a straight line having a slant of the trailing arm that starts from this point. There are restrictions in the freedom of layout of the suspension, and the height of the roll center RC is largely changed by the operation of the lateral rod 53 of a short length during the up-and-down vibration of the wheels 50 to adversely affect the handling safety of the vehicle.

Therefore, in order to solve these problems as mentioned above, it is an object of the present invention to provide a steerable rear wheel suspension which can minimize an amount of movement with respect to the horizontal direction of the wheels during the up-and-down movement of the wheels and reduce the height of the roll center and its variation rate to enhance the freedom of layout and handling safety.

SUMMARY OF THE INVENTION

Accordingly, the present invention is created in order to solve the problems as mentioned above.

It is an object of the present invention to provide a rear wheel suspension comprising:

an axle beam for rotatably supporting wheels disposed on both sides of the axle beam;

a strut assembly disposed on an upper portion of both sides of the axle beam; and a lateral rod having first connecting portions connected to a first end of the axle beam and second connecting portions connected to a car body on the opposite end of said lateral rod to be horizontally disposed in the direction of an axle.

The above mentioned lateral rod is formed of a pair of upper and lower rods being spaced apart by a first predetermined width at a first end thereof and spaced apart by a second predetermined width at a second end thereof, and one connecting point is connected to the axle beam by inserting a separate connecting member and the other connecting points are connected directly to the car body.

The present invention provides a rear wheel suspension using a connecting member that has connecting points attached to the connecting portions disposed at first ends of the rods, and another connecting point fixed to the axle beam.

Both of the first connecting portions and the second connecting portions of the upper and lower rods forming lateral rods are connected respectively to the axle beam and the car body by an elastic bush.

The predetermined width between the first connecting portions of the upper and lower rods is larger than the predetermined width between the second connecting portions.

The lateral rod is formed of upper and lower rods, and a point interconnecting an extending line for joining connecting portions of the upper rod to each other and an extending line for joining connecting portions of the lower rod to each other becomes an imaginary mounting point to have a very long imaginary lateral rod.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF PREFERRED EMBODIMENTS

Figure 1:
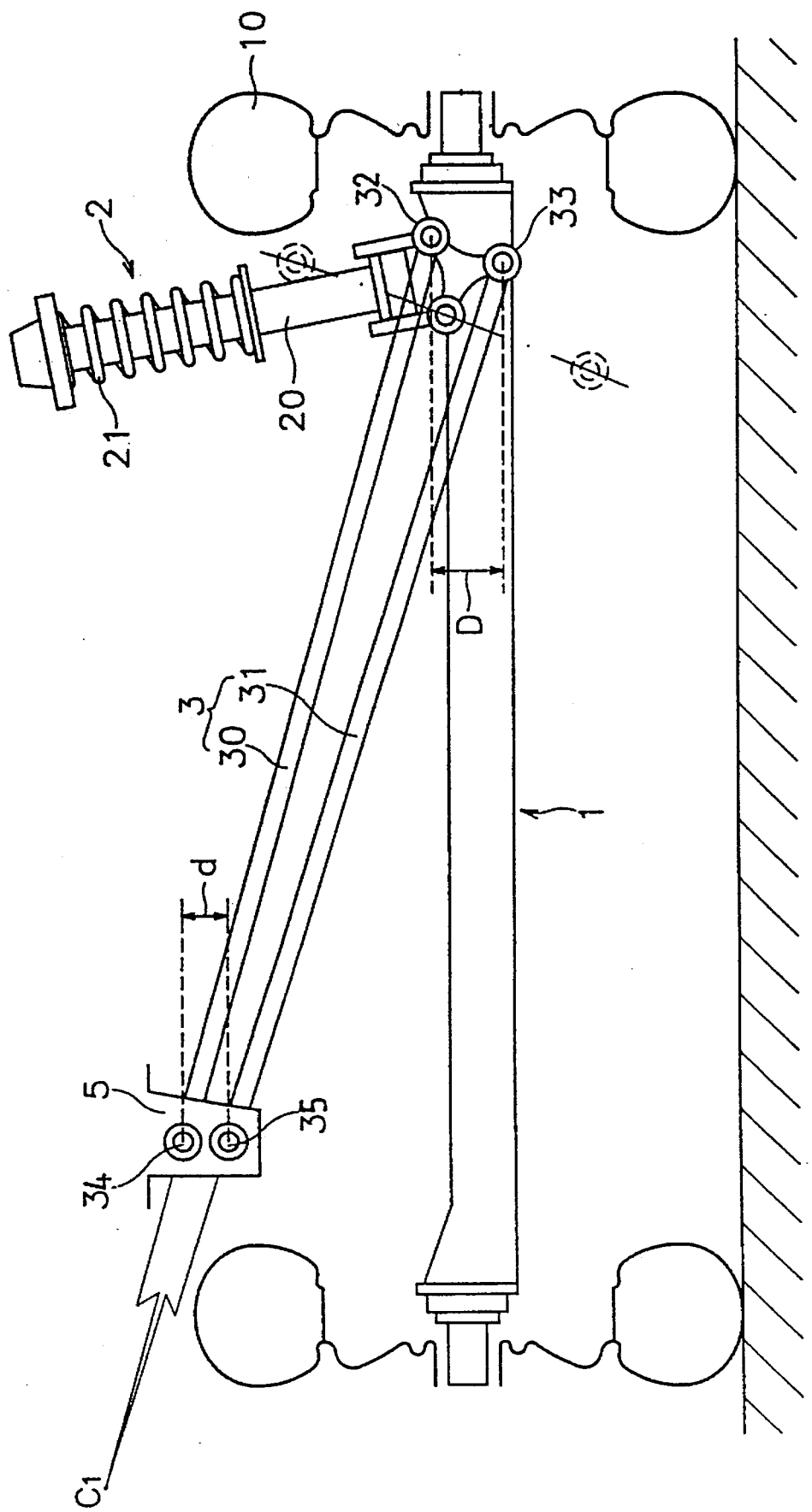
FIG. 1 is a rear view of a rear wheel suspension in accordance with the present invention.

FIG. 1 is a first embodiment of a rear wheel suspension of the present invention. The wheels 10 are rotatably supported on both sides of an axle beam 1. When the axle beam 1 is applied to a rear wheel driving vehicle, an axle is inserted to the inside of the axle beam. If the axle beam 1 is applied to a front wheel driving vehicle, a wheel carrier is rotatably supported at both ends of the axle beam.

Figure 2:
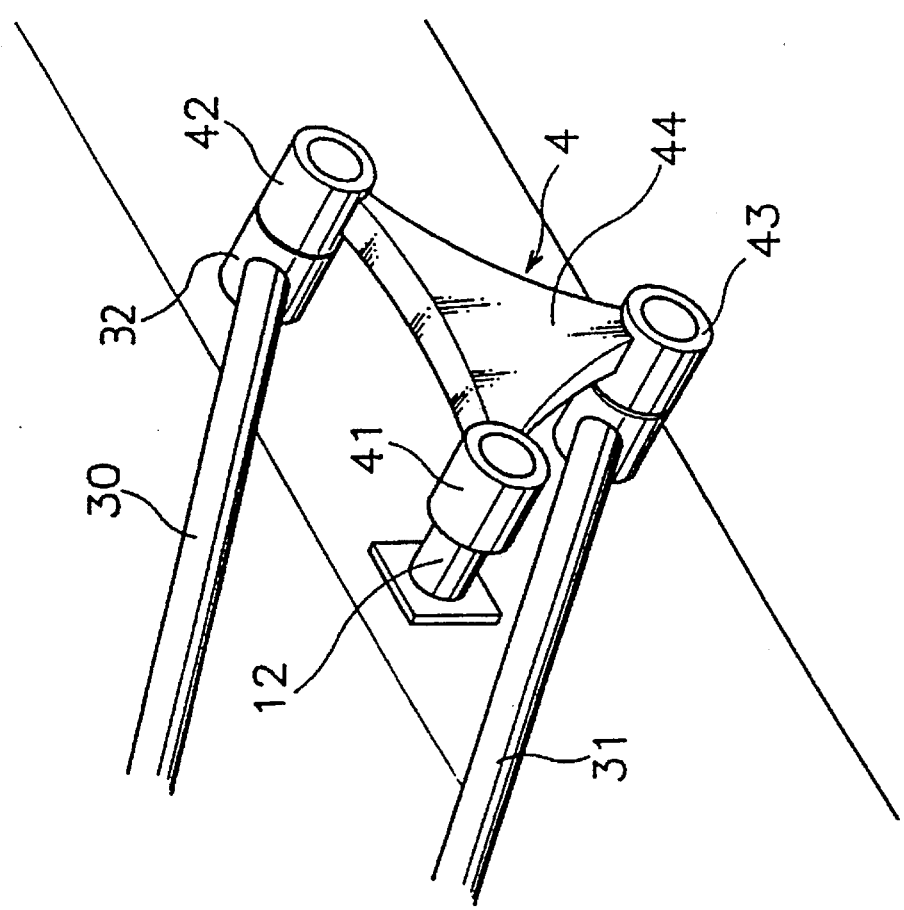
FIG. 2 is an enlarged perspective view of part A of FIG. 1 in accordance with the present invention.
Figure 3:
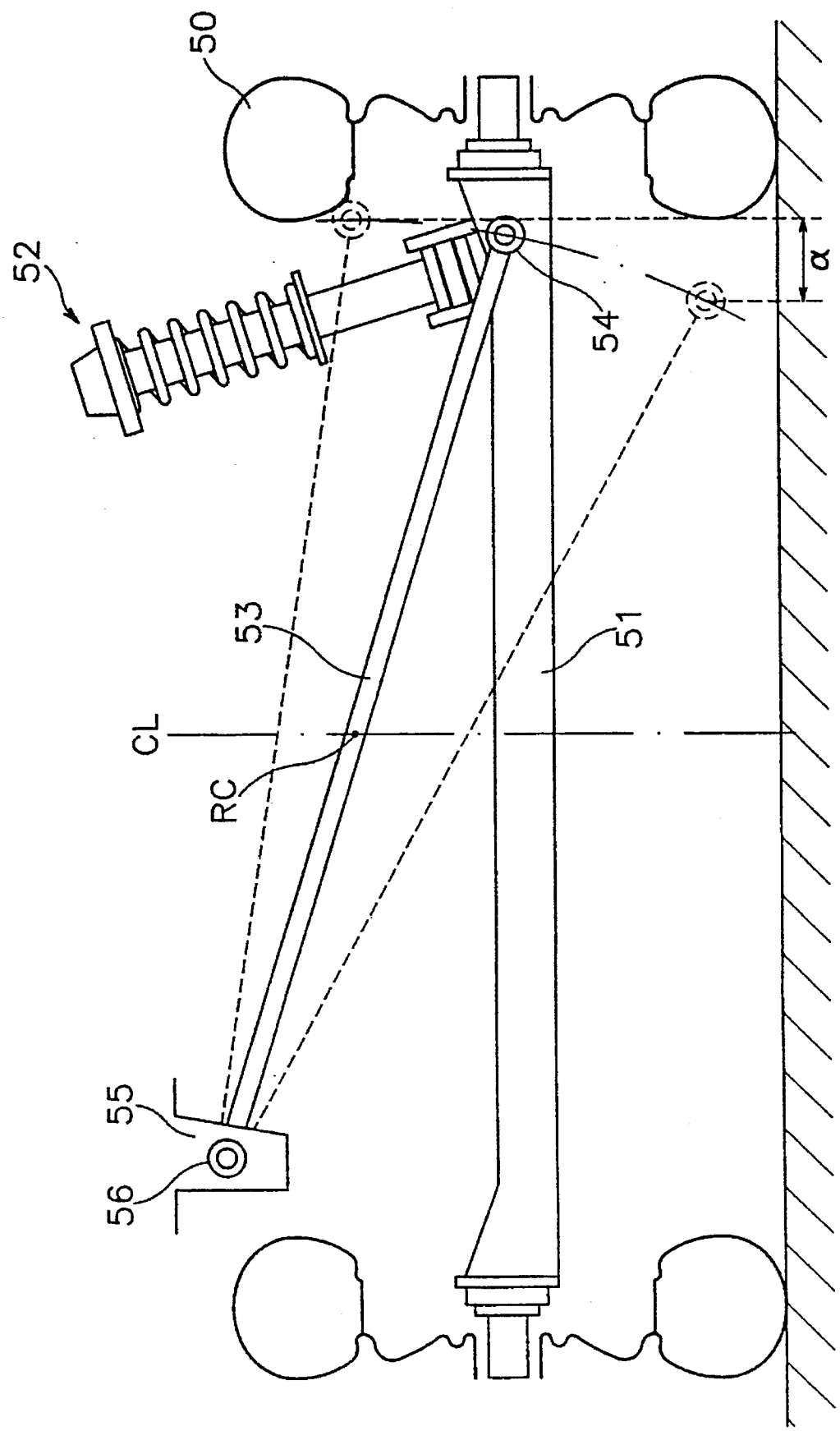
FIG. 3 is a rear view of a conventional rear wheel suspension.

A strut assembly 2 of several types disposed on the upper part of both ends of the axle beam 1 may be applied to the rear wheel suspension in accordance with a suspension system. A suspension of the present invention uses a strut type shock absorber 20 on which a spring 21 is mounted. A lateral rod 3 disposed laterally of a car body 5 is formed of upper and lower rods 30, 31. A pair of first connecting portions 32, 33 are connected to one side of the axle beam 1 by a separate connecting member 4, as shown in FIG. 2, and a pair of second connecting portions 34, 35 are connected to the car body 5. The pair of rods 30, 31 connects the axle beam 1 and the car body 5 through the connecting member 4. The connecting member 4 has first and second connecting points 42, 43 attached to the connecting portions 32, 33 disposed at one end of the rods 30, 31, and through the third connecting point 41, the connecting member 4 is fixed to the axle beam 1.

The pair of first connecting portions 32, 33 of the upper and lower rods 30, 31 that form the lateral rod 3 are connected to the connecting points 42, 43 of the connecting member 4 by inserting an elastic bush. In addition, the pair of second connecting portions 34, 35 of the upper and lower rods 30, 31 are connected to a predetermined portion of the car body 5 by inserting an elastic bush, with each space being of a predetermined width. A space D between the pair of first connecting portions 32, 33 of the upper and lower rods 30, 31 is formed to be larger than a space d between the pair of second connecting portions 34, 35.

The elastic bush used for connecting the lateral rod 3 is formed to have a predetermined elastic force, like the one that is applied to a general suspension system. This elastic bush controls the lateral rod 3 so that the lateral rod 3 may operate smoothly.

Accordingly, the lateral rod 3 formed of the pair of upper and lower rods 30, 31 may operate smoothly at the time of rolling of the car body or the up-and-down vibration of the wheels 10. Because the space D is larger than the space d, a point interconnecting an extending line for connecting the connection portion 32 of the upper rod 30 to the connecting portion 34 and an extending line for connecting the connecting portion 33 of the lower rod 31 to the connecting portion 35 becomes an imaginary mounting point C1, and the imaginary mounting point C1 is disposed far from the pair of rods 30, 31. As a result, the present invention provides much longer imaginary rods than the practical rods 30, 31.

The up-and-down displacement of the wheels 10 is made by the movement trace in accordance with the length of the imaginary lateral arm. The displacement is infinitesimal, and the amount α of the movement of the wheel 10 in the lateral direction is minimized to enhance the car's straight ahead stability.

In addition, change in the height of the imaginary mounting point C1 is relatively decreased by the above-mentioned operation, which implies a slight change in the height H of the roll center RC. The slight change in the height H of the roll center RC results in an enhancement of driving safety, and the handling safety is thereby increased.

The height of the roll center can be determined by the position of the upper and lower rods 31, 32, and thus, the freedom of layout is enhanced.

By using a lateral rod having two upper and lower rods disposed with each space being of a predetermined width, in accordance with this invention, the amount of movement in the horizontal direction during the upper-and-lower movement of the wheels can be minimized and the freedom of layout can be enhanced by reducing the height of the roll center and its change. In addition, handling safety as well as the vehicle's straight ahead stability may be increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear wheel suspension for a vehicle comprising:

an axle beam for rotatably supporting wheels disposed on both sides of said axle beam;

a strut assembly disposed on an upper portion of both ends of said axle beam; and a lateral rod having first connecting portions rotatably connected to a first end of said axle beam and second connecting portions rotatably connected to a car body on the opposite end of said lateral rod to be horizontally disposed in the direction of an axle;

said lateral rod including an upper and a lower rod spaced apart by a first width at the first end and spaced apart by a second width at the second end, wherein the first connecting portion is rotatably connected to the axle beam by inserting a separate connecting member therebetween and the second connecting portion is rotatably connected directly to the car body, and the separate connecting member has connecting points rotatably connected to each of the first connecting portions and another connecting point rotatably connected to the axle beam.

2. The rear wheel suspension as claimed in claim 1, wherein both of the first connecting portions and the second connecting portions of the upper and lower rods forming lateral rods are connected respectively to the axle beam and the car body by an elastic bush.

3. The rear wheel suspension as claimed in claim 1, wherein the first width between the first connecting portions of the upper and lower rods is larger than the second width between the second connecting portions.

* * * * *